United States Patent

[11] 3,593,780

[72] Inventor James Patrick Donnelly
 112 Hauerhill St., North Reading, Mass. 01864
[21] Appl. No. 822,601
[22] Filed May 7, 1969
[45] Patented July 20, 1971

[54] HEATING AND COOLING SYSTEM
 8 Claims, 10 Drawing Figs.
[52] U.S. Cl. ................................................ 165/22, 165/50
[51] Int. Cl. ................................................ F24f 3/00
[50] Field of Search .......................................... 165/22, 50, 12

[56] References Cited
UNITED STATES PATENTS
2,492,757 12/1949 Meek ............................ 165/22
3,109,486 11/1963 Hansen ........................ 165/22
3,127,929 4/1964 Ringquist .................... 165/22

Primary Examiner—Charles Sukalo
Attorney—Porter & Meyer

ABSTRACT: An air-conditioning system for multiple zone building units, including heating and cooling, in which the delivery of a heated or chilled liquid heat exchange medium (water) to heat exchange units (fan coils) in each zone to be conditioned, is individually controlled by a thermostat in each such zone, and which includes a single pipe closed distribution system for each individually controlled zone for circulating the heated or chilled water, to each zone separately and alternatively and in opposite directions through its single pipe closed distribution system, a heater adapted to supply heated water to the closed distribution system of each individually controlled zone, a chiller adapted to supply chilled water to the closed distribution system of each individually controlled zone, and valve means in the closed distribution system in each zone for controlling the supply of heated water to the closed distribution system in each zone, and for returning it to the heater, and for controlling the supply of chilled water to the closed distribution system in each zone, and for retuning it to the chiller, the supply of such heated and chilled water to the closed distribution system in each zone being separately and alternatively controlled by the thermostat in each controlled zone.

JAMES P. DONNELLY
Inventor

By Porter + Mayer
Attorneys

JAMES P. DONNELLY
*Inventor*

By Porter + Weyer
*Attorneys*

JAMES P. DONNELLY
*Inventor*

By *Poter + Weyer*
*Attorney*

HEATING AND COOLING SYSTEM

SUMMARY OF THE INVENTION

Briefly, my invention comprises an air-conditioning system for multiple zone building units, including both heating and cooling, in which the heating and cooling medium is delivered to fan coils in each controlled zone through a single pipe closed distribution system to each controlled zone, flowing in said pipe in opposite directions, separately and alternatively as controlled by a thermostat in each controlled zone. A heater or boiler provides a supply of heated water, and a chilling or refrigerating unit provides a supply of chilled water. The heated or chilled water is delivered alternatively to the single pipe closed distribution system in each controlled zone, as controlled by the thermostat in each zone, through two specialized three-way valves at each end of the single pipe closed distribution system. The heated water is delivered to the single pipe closed distribution system in each controlled zone through the first three-way valve, and is returned to the heater through the second three-way valve. Conversely the chilled water is delivered to the same single pipe closed distribution system of each controlled zone in the opposite direction, entering through the second three-way valve and returning to the chiller through the first three-way valve.

Another feature of my invention is a control panel for each zone to be controlled, which includes a replaceable plug-in transformer, relay, and a replaceable power head for the three-way valves provided in each zone.

Objects and advantages of my air-condition system include:
1. reduced installation costs, amounting to savings in labor and materials of at least 30 percent;
2. savings from fewer holes cut in flooring, walls and timbers, which are reduced 75 percent in size and number, because of running one pipe instead of four, to each controlled zone;
3. savings in many smaller pipes, because smaller pipes can be used in each controlled area;
4. efficiency of operation, because there is no mixing of the hot and chilled water, so that when a change is made from heated to chilled water, for instance, the fans to the coils are not actuated until the change over has been effected.
5. individual control for each controlled area, with one area being heated more than another, and while another is even being cooled, for instance;
6. with my single pipe system, with a single thermostat controlling both heating and cooling, it is impossible for the system to heat and cool the same controlled area at the same time, as frequently occurs with a split system, with resultant inefficiency and expense;
7. with my control panel having replaceable plug-in transformers and relays, and a replaceable power head to actuate the three-way valve, my system can be maintained and operated at minimum expense by an unskilled custodian, and does not require the services of a stationary engineer or an electrician;
8. my system further readily lends itself for total energy installations where total requirements of electricity, heating and cooling are provided from one total energy source;
9. in short, my system provides individual control of heating and cooling for individual units as desired, as in the conventional four-pipe system, but at substantially less cost of installation and operation, and with substantially greater efficiency and simplicity of operation with resultant lesser cost.

REFERENCE TO THE DRAWINGS

DETAILED DESCRIPTION

My heating and cooling system is designed for multiple zone building units, which will include apartment houses, hotels, motels, such as cottage type hotel units, college dormitories, office buildings and in short any multiple units heated and cooled from a central plant, where it is desired to give an individual unit control over its own heating and cooling requirements. Even if the heating and cooling system is not tailored to the whims of individual occupants of units, there are many situations as in large apartment houses, where different exposure to sun and wind conditions will require varying treatment of the heating and cooling provided for the different multiple units. While I describe my system as a heating and cooling system, it seems that a more apt phase is air conditioning, which will be understood to include both heating and cooling.

Figure 1:
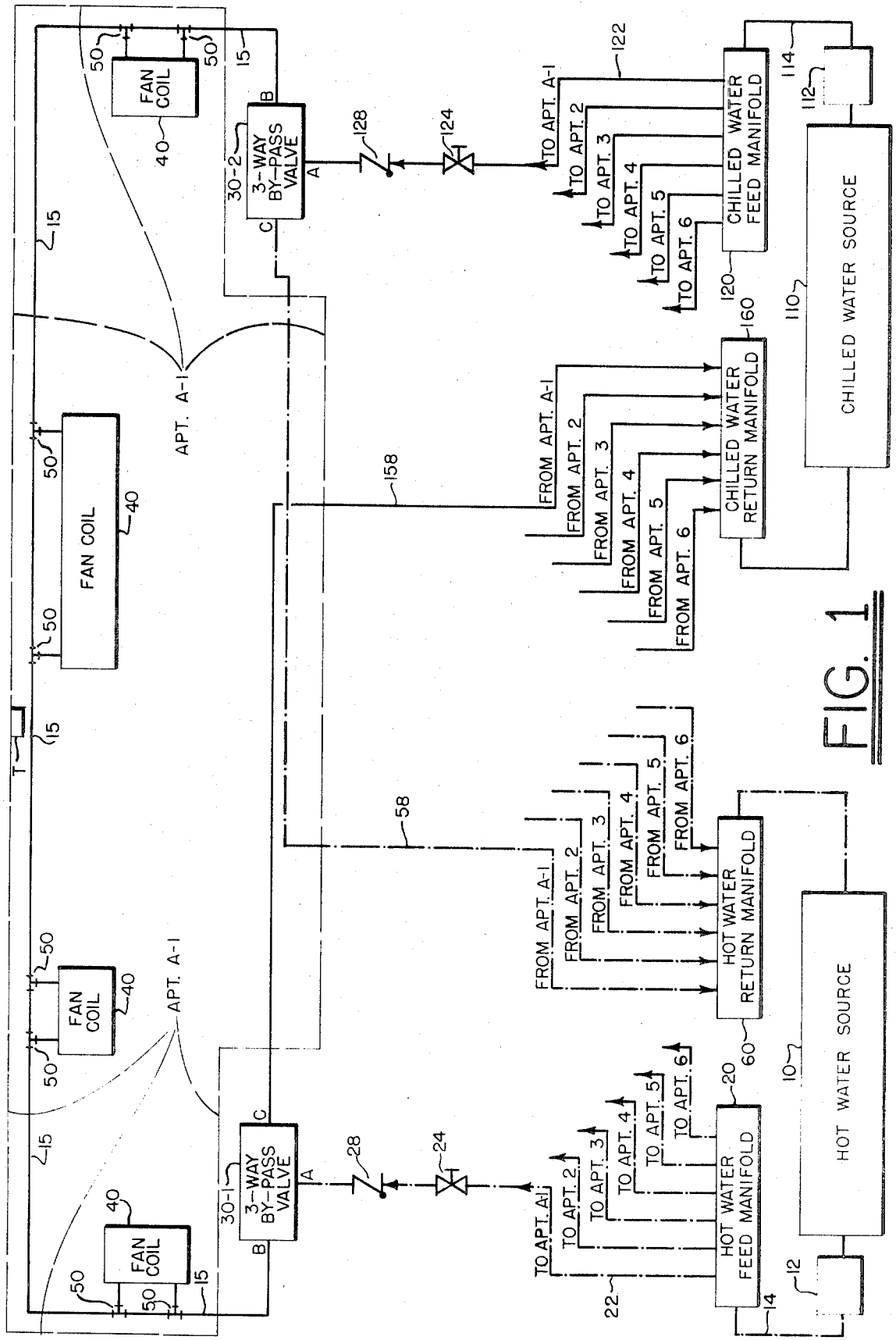
FIG. 1 is a diagram of my heating and cooling system for multiple zone building units.

As shown herein, particularly in FIG. 1, one hot water feed line, a hot water return line, a chilled water feed line and a chilled water return line are shown leading to and from apartment No. 1. But, FIG. 1 is a diagram of my system adapted for heating and cooling six apartments, Nos. 1 to 6 in an apartment house, and it will be understood that the feed return lines, the bypass valves and the like, as shown in FIG. 1, will be duplicated for the apartments Nos. 2 to 6, and for as many other controlled units or areas as there may be in the multiple zone building units.

FIG. 1 is a diagram showing the mechanism and operation of my heating and cooling system. As shown in FIG. 1, 10 represents the hot water source, which is a conventional type of heater or boiler, fired by gas, oil, or electricity, as desired. The heating medium is water preferably, although it can be other suitable liquid media. A pump 12 is installed in the common main line 14 leading to each controlled zone which leads from the source 10 to the hot water feed manifold shown generally at 20. Pump 12 is continuously operating, its operating being maintained by an Aquastat (not shown) located outdoors, set to cut off when the outdoors temperature reaches 70° F. The hot water feed manifold 20 leads to the hot water feed line 15, and includes as parts a small portion of the hot water feed line 15, a small portion of the chilled water return line (since the chilled water returns through the first three-way bypass valve 30-1 to the chilled water source, (described below), a shutoff valve 24, a check valve 28, and the first three-way bypass valve 30-1, all mounted on the hot water feed line 15 leading to apartment No. A-1. It will be understood that each manifold 20 and its component parts for each apartment are mounted in a convenient location, such as the basement or the janitor's office, or closet, and are outside of the apartment. Shutoff valve 24 is a manual shutoff valve, to be shut off when a particular apartment is vacant, or otherwise is not air-conditioned. The check valve 28, shown in FIGS. 6A and B and described in detail below, is provided as a safety valve to prevent any leakage or mixing of the hot and chilled water flowing through the first three-way bypass valve 30-1, and is unnecessary if valve 30-A in bypass valve 30 positively seats so as to prevent any mixing of the hot and chilled water in line 15.

Figure 4A:
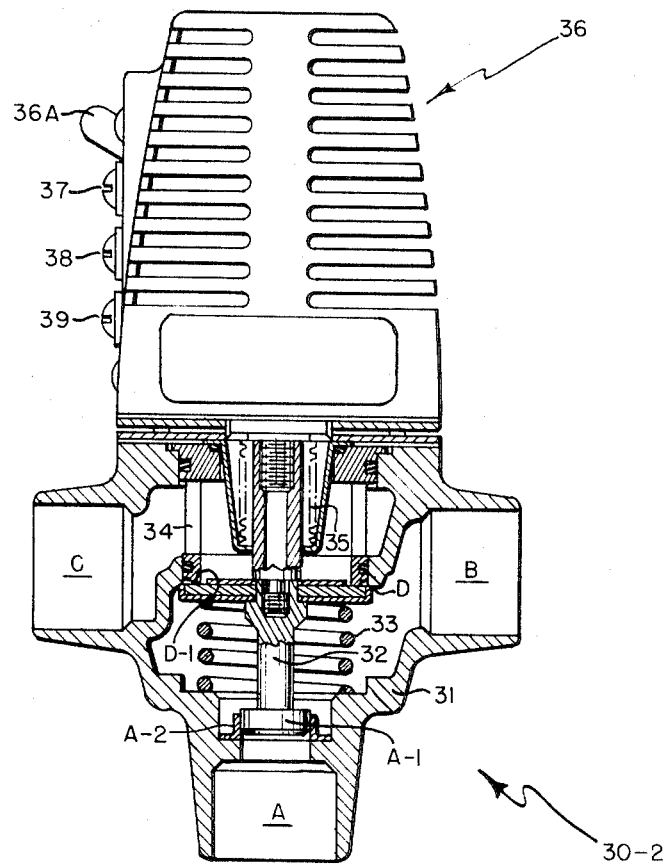
FIG. 4A is a vertical sectional view of one of my three-way bypass valves.
Figure 4B:
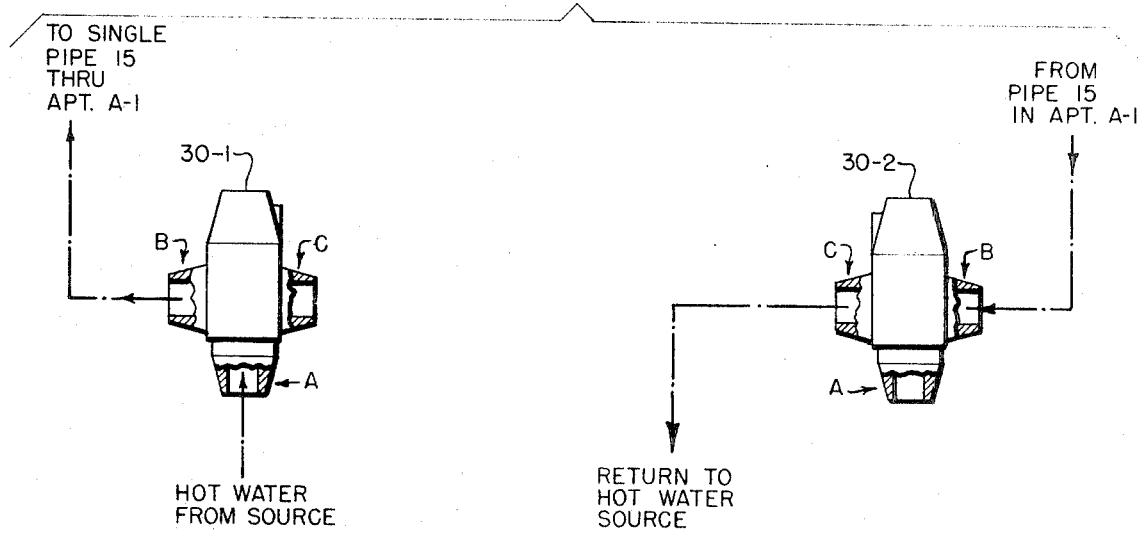
FIG. 4B is a diagrammatic view of the operation of my three-way bypass valves on the heated water side.
Figure 4C:
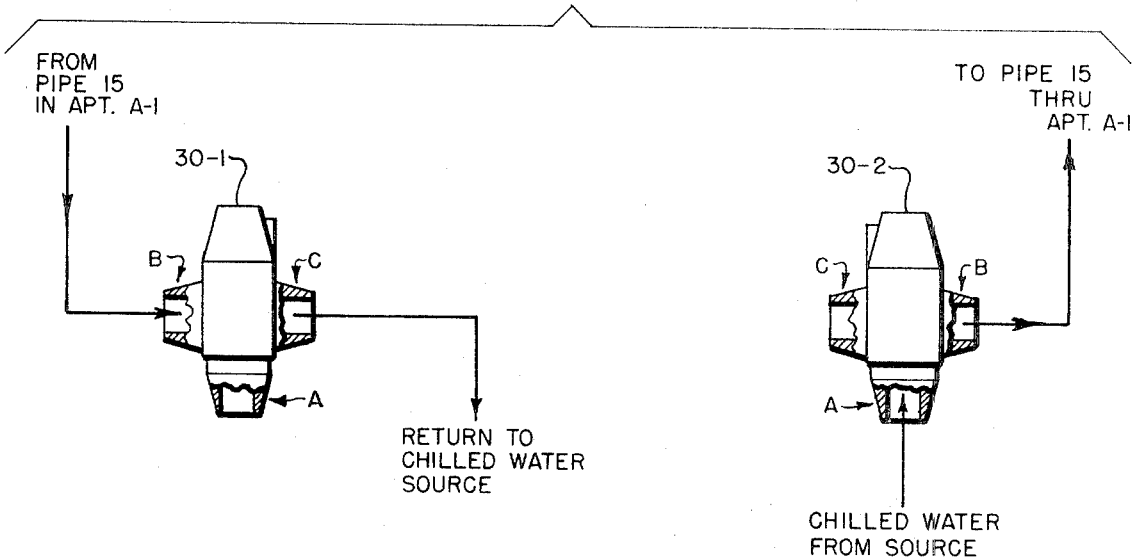
FIG. 4C is a diagrammatic view of the operation of my three-way bypass valves on the chilled water side.
Figure 5A:
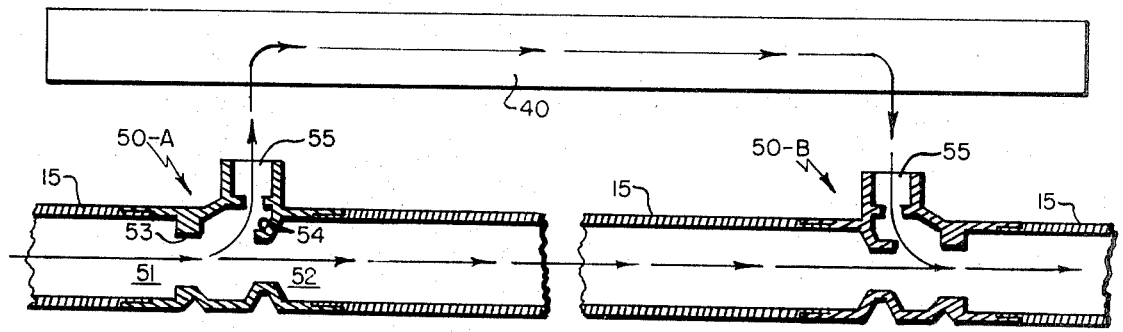
FIG. 5A is a vertical section of the Venturi fittings used in my heating and cooling system operating to conduct the heated water.
Figure 5B:
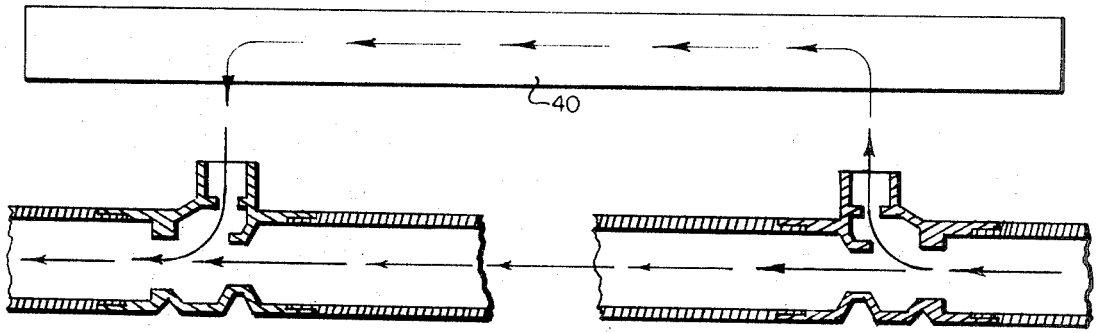
FIG. 5B is a vertical section of the Venturi fittings used in my heating and cooling system operating to conduct the chilled water.

The three-way bypass valve 30 is a modified valve of novel construction so far as I am aware, although three-way bypass valves as such as known to be old. The three-way bypass valve is shown in FIG. 4A and its operation is shown in FIGS. 4B and 4C, and is described in detail below. The valves 30 (FIG. 4A) are Model No. 560 Taco bypass valves, manufactured by Taco, Inc. of Cranston, R.I. It suffices for present purposes to state that the first valve 30 includes three ports, port A at the bottom, through which the hot water enters, to exit through port B and thence passing in a clockwise direction through the feed line 15, which traverses the perimeter of apartment No. A-1, FIG. 1, the borders of which are shown by the dashed line outlining it. In FIG. 1, the apartment A1 is shown as a four-room apartment, containing kitchen, dining room, living room and bedroom, and for that reason a series of four heat exchange units 40 are shown arranged on the feed line 15 traversing the apartment, each heating one room. But it is understood that more or less of the heat exchange units 40 can be used as needed. As shown the heat exchange units 40 are fan coils of standard construction, which include a coil (not shown) through which the heated (or chilled) water passes, and a motor-operated fan which blows ambient air across the coil, thus heating or (chilling) the air and the room accordingly. A pair of Venturi fittings or tees 50 is mounted on the feed line 15, a pair for each fan coil unit 40, which fittings and their operation are shown in FIGS. 5A and 5B and are described in detail below. The use of these Venturi fittings is not essential to the successful operation of my system of heating and cooling, but their use is desirable and preferable. However, the use of some restrictive means, such as a restricted or narrower pipe is desirable at each fan coil 40 to maintain uniform heating and to prevent loss of heat at each successive fan coil. But such restrictive means requires such careful engineering calculations and experimenting, that the use of the Venturi fittings is much to be preferred.

As shown in FIG. 1, a pair of three-way bypass valves 30 are used for each controlled area, here shown as apartment A-1, and the second valve 30-2 mounted in the feed line 15 after the last fan coil unit 40. The construction of valve 30-2 is identical with valve 30-1, except that it is turned around back to front, so that port B of valve 30-2 is now on the right as viewed in FIG. 1, and port C is on the left. But ports B and C are the same in each valve 30. Here the operation of valve 30-2 is such that the heated water return passes through valve 30-2, entering at port B, and exiting through port C, into the return portion 58 of feed line 15, here shown conventionally in dot-dash line, to pass into the hot water return manifold 60, and back to the hot water source 10, when it is reheated, and recirculated again.

The chilled water cycle is the exact reverse of the hot water cycle, with the chilled water passing in the opposite direction (i.e. counterclockwise FIG. 1) through valve 30-2 the single pipe 15 and valve 30-1 to return to the chilled water source 110. Chilled water source 110 is a conventional refrigerating unit, including motor, compressor and condenser or is of the absorption type (not shown). Each component part in the chilled water cycle is a duplicate of its counterpart used in the heated water cycle, and includes main line 114, feed line 115, chilled water feed manifold 120, which in turn includes the shutoff valve 124, the check valve 128, and the second three-way bypass valve 30-2. Here, as shown in FIG. 1, the chilled water enters bypass valve 30-2 through bottom port A, exits through port B, to pass in a counterclockwise direction through the single feed line 15, fan coil units 40, and thence on its return cycle through the first three-way bypass valve 30-1, entering through port B, and exiting through port C, through the chilled water return line 158 (not used by the hot water system) to return to the chilled water return manifold 160, and thence back to the chilled water source 110, to be chilled and recirculated again.

As an illustration, in operation, in my single pipe system, when heating is desired the hot water is heated to approximately 200° F. in the hot water source 10 and is delivered by pump 12 to the feed line 15 of apartment A-1 to each fan coil unit 40 successively. The hot water returns to the hot water source 10 at about 180° F., a temperature drop of about 20°, without loss of heating efficiency and is there reheated again to approximately 200° F. It will be understood that the temperature can be varied, as desired—less temperature being required in warmer climates, and greater heat loss is thus permissible, with lesser heating efficiency. Similarly the chilled water when cooling is called for, is pumped out by pump 112 at about 42° F. and in going through a single feed line 15 in the controlled area (apartment A-1) to each fan coil unit 40 successively experiences a heat rise of about 10° to 52° F. and is then returned to the chilled water source 110, to be rechilled to approximately 42° F. The chilled water range is necessarily more restricted, to avoid freezing and ice formation.

In operation, also, it will be understood that the thermostat T in apartment A-1 (FIG. 1) will be set to maintain a temperature in the apartment of 70° F., within a variation of 1½° F. above or below 70° F. If for instance, the temperature in apartment A-1 goes below 70° F. and the situation calls for more heat, thermostat T closes a switch in the powerhead 36 to actuate valve 30-2, opening valve D therein to allow the hot water in feed line 15 to pass through valve 30-2 from port B to port C by closing off port A and thence return through feed line 15 to the hot water source 10. At the same time that valve D in valve 30-2 opens, port A, being on the same stem 32 with valve D closes. This prevents any mixing of the heated and chilled water. The hot water pump 12, constantly operating, maintains the hot water in line 15 under constant pressure. It is understood that a bypass relief around valve 30-2 when it is closed to circulation of heated water may be provided, if desired. Valve D in three-way valve 30-2, under actuation from the thermostat T opens slowly, and the hot water begins to move through the feed line 15 in apartment A-1, and after an interval or timelag of about 90 seconds, switch 39 on the powerhead 36 on three-way valve 30-2 closes to operate the motors to the fans in each fan coil unit 40 in apartment A-1, which are now being supplied with 200° F. hot water to bring the temperature in apartment A-1 back to 70°F.

When the temperature in apartment A-1 reaches 70° F. (plus 1½° F. tolerance or variation) thermostat T closes valve D in three-way valve 30-2, so that hot water no longer flows through three-way valve 30-2, and after a short time interval, turns off the motors to the fans in each fan coil unit 40. This condition remains until the temperature in apartment A-1 again drops below 70° F. when the heating cycle is repeated.

Normally, in a temperate climate during the winter season, only heating will be required in all units of the controlled area. The chilled water source 110 and pump 112 is thus maintained in an inoperative condition being controlled by an outside thermostat or Aquastat (not shown), set to operate at 70° F. outside temperature. This is optional equipment, and is not necessary for operation of the system, as this can be done manually, if desired. Likewise, in the summer season normally only cooling will be required in the units of the controlled area. Thus the hot water source 110 and pump 112 can be maintained in an inoperative condition, being controlled by an outside thermostat or Aquastat (not shown) set to operate at 75° F. outside temperature. Thus by this means an occupant of a controlled area cannot turn on either heating or cooling unless outside temperature conditions justify or require it.

Figure 2:
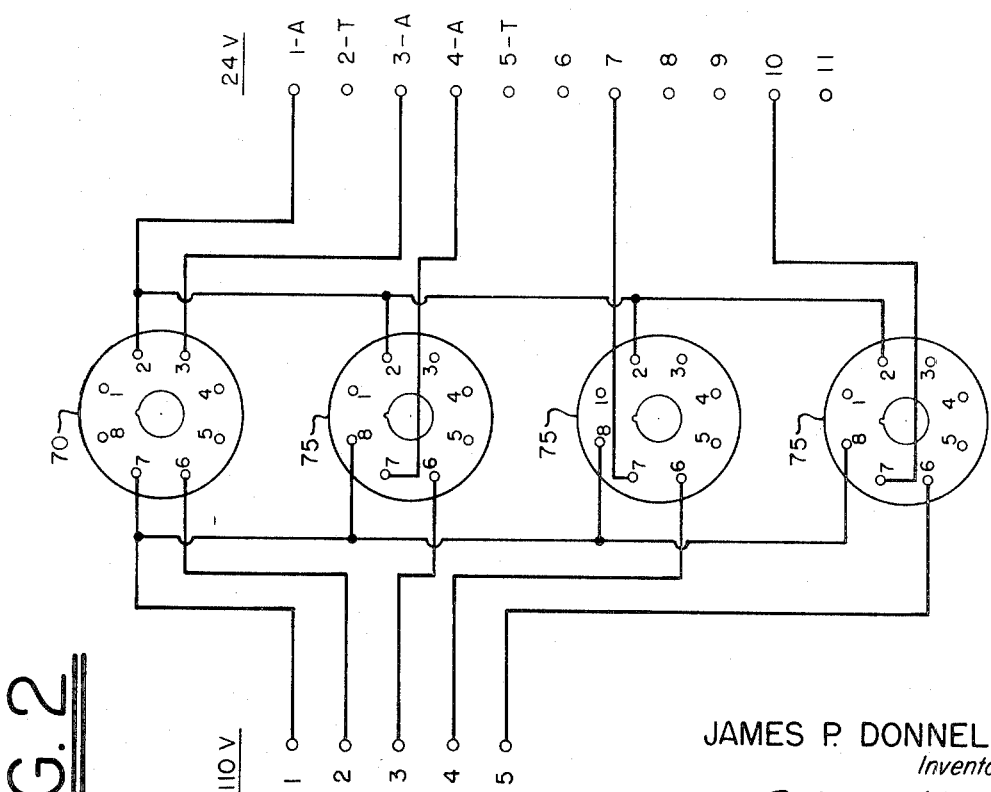
FIG. 2 is a wiring diagram of the control panel.

FIG. 2 is a wiring diagram of the control panel, which is placed in a convenient location for janitor service, and in a high-rise apartment building, one would preferably serve each floor. As shown in FIG. 2, panel is provided for increments of three apartments. The panel itself is a NEMA (National Electrical Manufacturers Association) class 1 panel and box, and includes a circular molded plastic panel having 8 pm sockets for one transformer to be plugged into said sockets. These active sockets are numbered 2, 3, 6 and 7, the others being holding sockets. One transformer is provided for each of apartments or controlled area and below are arranged three additional similar panels for relays, one for each of three apartments, to be plugged in similarly. Here the active sockets are 2 and 7, and 6 and 8, the others being holding sockets. As shown, alternating current is lead in at 110 v., is stepped down by the transformer to 24 volts as delivered to the thermostat T and thence to the three-way valves, as shown in FIG. 3, which shows the wiring diagram control for the thermostats and valves.

Figure 3:
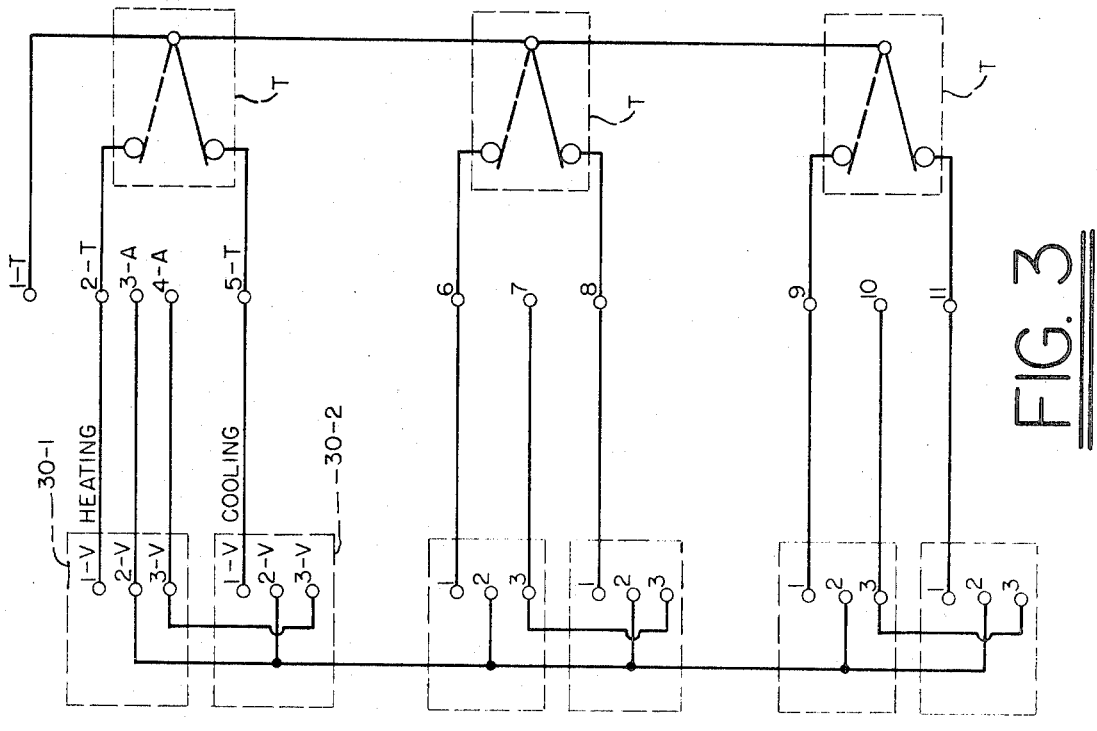
FIG. 3 is a wiring diagram of the thermostatic control of the three-way bypass valves, as installed by the electrical contractor for the multiple zone building unit.

In FIG. 3, the right-hand numbered column corresponds to the junction panel (right-hand column of FIG. 2) bearing numbers vertically downward from 1 to 11. It will be understood that the control panel (FIG. 2) is supplied intact by the heating contractor and FIG. 3 is the wiring diagram to be followed by the electrical contractor on the particular installation. Junction terminal 1A is terminal 1-T on FIG. 3 leading from the transformer. As shown in FIG. 3, the terminals in the right-hand column of FIG. 3 are the same numbered terminals as in FIG. 2, to which the electrical contractor connects in the panel box. As shown, the thermostat T in apartment A-1 leads alternately to the two three-way bypass valves at 1-V, to complete the circuit through 2-V and 3-A to operate valve 30-1 for cooling or valve 30-2 for heating, 3-V is the auxiliary switch of valves 30-1 and 30-2 which in turn through junction terminal 4A operates the relay, which actuates the motors to the fan coils 40 in apartment A-1. In each apartment the upper series of terminal 1-V, 2-V and 3-V are to valve 30-1 for cooling and the second series of terminals 1-V, 2-V and 3-V below are to valve 30-2 for heating and are operated by the thermostat T in the same manner.

The wiring diagram in FIGS. 2 and 3 operates as follows:

In FIG. 2 left-hand column terminals 1 and 2 provided 110-volt AC alternating current to the transformer which is plugged into the top panel 70. Terminals 2 and 3 of the top panel become the source of current for the 24-volt control circuit (FIG. 2, right-hand column). Terminal 2 of the 24-volt column leads to terminal 1A of FIG. 2, and thence to terminal 1-T of FIG. 3. When heat is called for terminal 1-T conducts electric current through the thermostat T to terminal 5-T, and thence to the control valve 30-2 of terminal 1V. This completes a circuit to provide power to open the control valve 30-2. In FIG. 3 the thermostat T in apartment A-1 thus described is set up for heating. Referring to FIG. 2, terminal 3 of panel 70 thus is the low side of the 24-volt circuit. Terminal 3 of panel 70 of FIG. 2, and 3A of FIG. 3 is the same terminal. 3A is between 2-T and 5-T of the thermostat circuit terminal. 3A of FIG. 3 is common to 2V of all bypass valves. So 1V and 2V closes the circuit that operates the valve bypass 30-2. The power head of the bypass valve 30-2 of FIG. 1 now activates 3-V circuit of FIG. 3, and 3-V completes the circuit back to 4A of FIG. 2. Terminal 4A then completes a 24-volt circuit of the relay for apartment 1 thereby operating terminal No. 6 of the relay panel 75 which operates the motors to the fan coils 40 in apartment No. 1 to deliver heat to the apartment. It will be understood that FIG. 2 can be put into a printed circuit.

It is understood that the cooling is the exact reverse. The only difference when the thermostat T calls for cooling is that 5T becomes inactive, and 2T becomes active which operates valve 30-1 of FIG. 1 to allow chilled water to circulate through feed line 15. Then terminals 2-V and 3-V become common to all valves 30-1 and 30-2 so that the rest of the circuit becomes the same. Only the valves 30-1, and 30-2 are energized when it is hot or cold.

The three-way bypass valves 30-1 and 30-2, FIGS. 1, 4A, 4B and 4C, will now be described in more detail. As stated above, valves 30-1, and 30-2 are identical valves, except that they are turned around front to rear. Thus in FIG. 1, valve 30-1 shows port B on the left side of the valve, and in valve 3-2, it appears on the right side. Ports B and C in both valves 30-1 and 30-2 are thus the same in each valve, although appearing on opposite sides to each other. So far as I am aware, valves 30-1 and 30-2 are of novel and unique construction. As best shown in FIG. 4A, which shows valve 30-2 arranged as it appeared in FIG. 1 mounted on feed line 15, the valves 30 include an entering port A at the bottom, a side port B, and a side port C. A pair of valves 30 are mounted on each end of the feed line 15 leading to each controlled area, such as apartment A-1, and each is a part of hot water feed manifold, and hot water return manifold respectively, as well as parts of the chilled water feed and return manifolds in my single pipe system. Each valve 30 operates so that the heated water and chilled water pass separately and alternatively in opposite directions through the single pipe 15. As shown in FIG. 1, the heated water passes through single pipe 15 in a clockwise direction, and the chilled water in a counterclockwise direction, but it will be understood that these directions of flow can be reverse.

As shown in FIG. 4A bypass valve 30 shows generally a hollow cylindrical body 31, having arranged therein a central vertically movable stem 32, tensioned by coil spring 33, and carrying on its lower end valve A-1, which seats against valve seat A-2 to close off entry port A, when stem 32 is moved downwardly by the power head, shown generally at 36. At its midsection, stem 32 carries valve D, which seats against valve seat D-1. It will be understood that ports B and C are closed off from each other, except when valve D is open, and when valve D is open port A is automatically closed, so that no water can enter or exit through port A. But when valve D is open water can pass from port B to port C (or vice versa) through orifices 34 in side walls D-1 also forming part of port C. A metal bellows 35 encloses the upper part of stem 32 to prevent leakage of water around the upper part of stem 32.

The power head 36 is of conventional construction, and hence is not shown in detail. Such power heads are manufactured and sold by Taco Inc. of Cranston, R.I. It suffices to say that the power head includes a vertically movable stem (not shown) actuated by a heat motor, operated from the thermostat T in apartment A-1. It will be understood that the heat motor is a hollow flexible metal or electrical bellows containing a gas which expands when heated electrically, and as it elongates, pushes down stem 32 of valve 30-2, opening valve D and closing port A, and allowing water to pass from port B to port C, for instance, and allowing the heated water to return to the hot water return manifold 60. Three electric terminals are provided on the side of power head 36 (FIG. 4A), which include terminal 37, which supplies power from the transformer at 24-volts to operate the heat motor, terminal 38 operated from the thermostat T, which closes the circuit to operate the heat motor to push stem 32 downwardly, and terminal 39. Terminal 39, as the heat motor elongates downwardly closes the circuit through an auxiliary switch to the relay, which in turn closes the circuit to operate the fan motors in the fan coils 40. It will be understood that the heat motor heats up slowly, and that there is an internal or timelag of about 90 seconds before the heat motor closes the circuit to the fan motors after the valve D has opened to pass the heated water through valve 30-2 from port B to port C into the return feed line 15 to the return manifold 60. This timelag thus insures the circulation of hot water in the feed line 15 in the desired range of 200° F., before the fan motors are turned on. A handle 36a, is further provided for manual operation of the valves 30-1 and 30-2, in case power head 36 fails to operate for any reason.

FIGS. 4B and C show the operation of the three-way bypass valves 30-1 and 30-2 on the heated water cycle, and on the chilled water cycle, respectively, as heretofore described.

FIG. 5A shows the construction and operation of the Venturi fittings on the heated water side, and FIG. 5B shows the same on the chilled water. These are mounted on the feed line 15, to conduct heated water through the fan coil units 40 in the same direction as it flows through the feed line 15—i.e. in a clockwise direction, as in FIG. 1—with the chilled water flowing in the opposite direction—i.e. counterclockwise, as in FIG. 5B. The Venturi fittings or tees 50 are of standard construction and a pair of them are mounted on the feed line 15 in a reversed arrangement, preferably on 18-inch centers, on the entrance and exit side to a fan coil unit 40. As is well known Venturi fittings such as 50 A and B include an inlet side 51, an outlet side 52, a slightly restricted orifice 53, a narrower or more restricted orifice 54, with a bypass outlet 50A between the two orifices 43 and 44. As shown in FIG. 5A the Venturi fitting 50 on the left 50A has the more restricted orifice 54 on the down stream side of the direction of flow of the heated water, which is shown to be in a clockwise direction; while the Venturi fitting 50B on the right is reversed to 50A, with its narrower orifice 55 on the upstream side of the direction of flow of the heated water. The result of this arrangement is that in operation Venturi fitting 50A by a suction action pulls or bypasses a constant percentage (approximately 30 percent) of the heated water through the fan coil unit 40 from the feed line 15, in the same direction of flow and returns it to the feed line through the second Venturi fitting on the right, as in FIG. 5A. The purpose, of course, is to provide heated water to all successive fan coil units 40 in a controlled area, as apartment A-1, at as near a constant temperature as possible, so that the heating provided successive fan coil units will be substantially uniform throughout a controlled area.

FIG. 5B shows the construction and operation of the Venturi fittings, on the chilled water side. Here, of course the construction is the same, but the operation is in reverse, with the direction of flow of the chilled water being reversed—in a counterclockwise direction. This arrangement of the Venturi fittings 50A and B make it possible to circulate the heated and chilled water in opposite directions through a single pipe heating and cooling system. As explained above, the use of the Venturi fittings as described, is highly desirable, if uniform heating conditions are desired to be maintained between successive fan coil units in a controlled area. Other restrictive means are possible, but would normally require such careful engineering calculations to maintain uniform heating conditions between successive fan coil units as to make their use impractical.

Figures 6A, 6B:
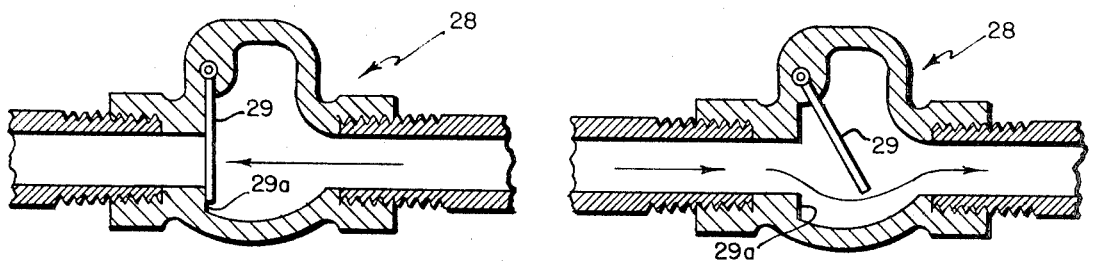
FIG. 6A is a vertical section of the check valve in open position.
FIG. 6B is a vertical section of the check valve in closed position.

FIG. 6A and B shows the check valve 28 in open position, and closed position respectively. Check valve 28 is of standard construction and in operation permits the flow of liquid through it in one direction (FIG. 6A) but prevents its flow through it in the opposite direction (FIG. 6B). For this purpose a hinged flap valve 29 is provided which opens with the flow of liquid through it from right to left in FIG. 6A, but closes against seat 29a to prevent the flow of liquid through it in the opposite direction (FIG. 6B). A check valve 28 is mounted on the feed lines 15 and 115 as shown in FIG. 1, as a precaution to permit the flow of heated water through port A in three-way valve 30-1, and chilled water through port A in three-way valve 30-2, but not in the opposite direction. This prevents the possible mixing of the heated and chilled water, with consequent losses of heating efficiency in my single pipe system.

It will be understood that variations and modifications may be made in my single pipe heating and cooling system without departing from my invention, as described in the appended claims.

I claim:

1. In an air-conditioning system for heating and cooling multiple zone building units, which includes
    a source of supply of heated water,
    a source of supply of chilled water,
    a single pipe closed distribution system in each individual controlled area connecting said sources of supply for conducting heated and chilled water through each said closed distribution system,
    heat exchange means in each said closed distribution system for each individual controlled area;
    a single thermostat in each controlled area and means automatically controlled by the thermostat in each individual controlled area for conducting heated or chilled water through the single pipe closed distribution system in its area;
    and means for returning said heated and chilled water each to its respective source;
    said means controlled by said thermostat including
    a pair of three-way bypass valves each said bypass valve arranged at opposite ends of each said single pipe closed distribution system, the first said bypass valve adjacent said source of supply of heated water, the second said bypass valve adjacent the source of supply of chilled water each said bypass valve in normal nonactuated position connecting said single pipe closed distribution system to the respective said source of supply and in actuated position the first said bypass valve connecting said single pipe closed distribution system with said means for returning chilled water to its source and the second said bypass valve connecting said single pipe closed distribution system with said means for returning heated water to its source;
    a pair of check valves, the first said check valve arranged between the first said bypass valve and the said source of supply of heated water, the second said check valve arranged between the second said bypass valve and the said source of supply of cooled water, both said check valves arranged to permit flow of water from the respective said source of supply to the respective said bypass valve but not in the opposite direction;
    said thermostat separately and individually actuating one said bypass valve or the other, the first said bypass valve being actuated when passage of chilled water through said single pipe closed distribution system is called for and the second said bypass valve being actuated when passage of heated water through said single pipe closed distribution system is called for;
    whereby heated or chilled water is conducted through said single pipe closed distribution system in opposite directions as called for by said thermostat.

2. An air-conditioning system as claimed in claim 1, in which said heat exchange means includes a fan and coil unit, in which a motor operated fan forces air across the coil.

3. An air-conditioning system as claimed in claim 1, in which said heat exchange means includes a restrictive means for maintaining flow of heated or chilled water at uniform temperatures to successive heat exchange means.

4. An air-conditioning system as claimed in claim 3, in which said restrictive means includes Venturi fittings leading to and from said successive heat exchange means in each controlled area.

5. An air-conditioning system as claimed in claim 1 in which the means automatically controlled by the thermostat in each controlled area also includes power means for actuating the respective said three-way bypass valve responsive to temperature conditions in each controlled area.

6. An air-conditioning system as claimed in claim 5, in which said power means for actuating said three-way bypass valves includes a control panel having a replaceable plug-in electrical transformer, a relay and a power head.

7. An air-conditioning system as claimed in claim 2 wherein each said bypass valve includes means for actuating the fan in each said heat exchange means upon being actuated by said thermostat.

8. An air conditioning system as claimed in claim 7 wherein there is a timelag between when the bypass valve is actuated and when the valve in turn actuates the fan in each said heat exchange means.